United States Patent
Lin et al.

(10) Patent No.: US 7,750,979 B2
(45) Date of Patent: Jul. 6, 2010

(54) PIXEL-DATA LINE BUFFER APPROACH HAVING VARIABLE SAMPLING PATTERNS

(75) Inventors: Chien-Hsin Lin, Sunnyvale, CA (US); Kevin Chin, Cupertino, CA (US)

(73) Assignee: Trident Mircosystems (Far East) Ltd., Grand Cayman (KY)

( * ) Notice: Subject to any disclaimer, the term of this patent is extended or adjusted under 35 U.S.C. 154(b) by 2749 days.

(21) Appl. No.: 10/045,929

(22) Filed: Oct. 26, 2001

(65) Prior Publication Data

US 2003/0081684 A1  May 1, 2003

(51) Int. Cl.
*H04N 5/14* (2006.01)
*H04N 9/64* (2006.01)

(52) U.S. Cl. .................. 348/576; 348/571; 715/788
(58) Field of Classification Search .......... 348/571, 348/715–718, 561, 537, 581, 596; 345/684, 345/686, 687, 689; 715/788, 789; 341/122
See application file for complete search history.

(56) References Cited

U.S. PATENT DOCUMENTS 4,485,402 A * 11/1984 Searby ................. 348/715
5,075,673 A * 12/1991 Yanker ................. 345/163

FOREIGN PATENT DOCUMENTS

EP  0 767 588  4/1997

* cited by examiner

*Primary Examiner*—M. Lee
(74) *Attorney, Agent, or Firm*—DLA Piper LLP (US)

(57) ABSTRACT

A pixel-data processing circuit delivers a fixed number of pixels to a video processing stage using an irregular sampling pattern that is defined by a variably-definable sampling window. In one example embodiment directed to processing an input stream of pixels corresponding to an array of video pixels, the window size is selected from one of various options for sampling subsets of the array as a two-dimensional window that spans the pixels in the array. A sampling-window is used such that the window size is a multiple of the sampling-window size and the sampling-window size defines the fixed number of pixels. The processing includes concurrently moving pixel data from the input stream into a first set of line buffers with the pixels stored in the first set of line buffers including pixels for the established window size, prefetching the stored pixels from the first set of line buffers into a second set of line buffers, the second set of line buffers being sufficiently long to store at least the pixels corresponding to the established sampling-window size, and fetching the fixed number of pixels from the second set of line buffers. In various applications, in addition to flexibility, the present invention realizes enhanced throughput.

28 Claims, 3 Drawing Sheets

PIXEL-DATA LINE BUFFER APPROACH HAVING VARIABLE SAMPLING PATTERNS

RELATED PATENT DOCUMENTS

The instant patent application is related to concurrently-filed, co-pending U.S. Patent Application entitled, "Motion Compensation With Subblock Scanning," Appl. No. 10/044,877, herein incorporated fully by reference.

FIELD OF THE INVENTION

The present invention is directed to video signal processing and, more particularly, to motion compensation in video signal processing.

BACKGROUND

Computer arrangements, including microprocessors and digital signal processors, have been designed for a wide range of applications and have been used in virtually every industry. For a variety of reasons, many of these applications have been directed to processing video data and have demanded minimal levels of power consumption and compactness. Some applications have further demanded a high-speed computing engine that can perform effectively on a real-time or near real-time basis. Many of these video-processing applications have required a data-signal processing circuit that is capable of performing multiple functions at ever-increasing speeds.

Increasing the power and versatility of such computing engines, however, can undermine other important goals. For example, faster computing engines consume more power and circuit real estate, whereas the ideal engine minimizes both power consumption and the amount of circuitry required to implement the computing engine.

Moreover, providing versatility and high power typically exacerbates the circuit real estate problem by requiring various types of processing circuitry, each specialized and selectively activated for different processing functions. This phenomena can be appreciated when comparing, for instance, relatively-slow general-purpose processing in video applications versus specialized video-signal filter processing used for compressing and decompressing video data in real time. Because the specialized processing circuitry is typically optimized to keep up with the real-time speeds of the video data, it is often difficult to provide a single video-data processing circuit that is adequately versatile without providing seemingly excess circuitry useful only for limited applications.

As a more particular example, many video-signal processing applications employ various specialized video-signal processing architectures for high-speed processing functions applied to the video data. These high-speed processing functions include, among many others, general low-pass and high-pass filtering, motion-compensated scan-rate conversion, and scaling and peak filtering. In video-processing applications, these functions are often performed by manipulating data stored to represent the horizontal and vertical lines used to refresh the display data representing the displayed pixels.

In each of the above video-processing applications, there is a significant cost in connection with designing, manufacturing and maintaining the integrated circuits used to provide such functionality. For example, one high-speed implementation operating in a relatively noiseless environment might permit sampling pixel data corresponding to a video frame, e.g., as stored in memory or captured via a camera, at a relatively infrequent rate, and another high-speed implementation might require sampling the pixel data at a relatively frequent rate. The high-speed architectures used to post-process (e.g., filtering) such differently sampled data would typically be implemented differently. In each such application, the costs associated with such architecturally-incompatible architectures are significant.

Accordingly, there is a well-recognized need to develop a relatively compact video-processing architecture that accommodates these multiple functions without a significant loss in data-processing throughput. It has been particularly difficult maintaining the high-throughput and providing an architecture that is sufficiently flexible for use in a wide variety of application; efforts to realize such goals have thus far been competing tensions. The present invention is directed to a data-processing architecture that can deliver a fixed number of pixels to such a video processing stage using a sampling pattern that can be defined from a range of selectable sampling windows.

SUMMARY OF THE INVENTION

Various aspects of the present invention are directed to a data-processing approach using line-buffers that are decoupled and that can deliver a fixed number of pixels, as may be required by a video processing stage, using a sampling pattern that is defined as one among a plurality of selectable sampling windows. Advantages include minimization of line buffer usage, latency in pixel-data processing and, ensuing therefrom, power consumption.

Consistent with one example embodiment, the present invention is directed to processing an input stream of pixels corresponding to an array of video pixels, and where a variable window size is used for sampling subsets of the array as a two-dimensional window that spans the pixels in the array. The method delivers the input stream of pixels, in the form of a fixed number of pixels, to a video processing stage by first establishing a window size and a sampling-window size. In a more specific embodiment, the window size is a multiple of the sampling-window size and the sampling-window size defines the fixed number of pixels. The processing includes concurrently: storing pixels from the input stream into a first set of line buffers, the pixels stored in the first set of line buffers corresponding to the established window size; prefetching the stored pixels from the first set of line buffers into a second set of line buffers, the second set of line buffers being sufficiently long to store at least the pixels corresponding to the established sampling-window size; and, for the video processing stage, fetching the fixed number of pixels from the second set of line buffers.

In another related example embodiment, a video processing circuit, includes a programmable circuit for establishing a window size and a sampling-window size, such that the window size is a multiple of the sampling-window size and the sampling-window size defines the fixed number of pixels, and first and second sets of line buffers are used to process the data. A data processing circuit processes video pixels by concurrently performing the above-mentioned tasks of storing pixels from the input stream into the first set of line buffers, prefetching the stored pixels from the first set of line buffers into the second set of line buffers, and fetching the fixed number of pixels from the second set of line buffers.

Other example embodiments of the present invention are respectively directed to various other related aspects including method, circuit, and system-based implementations of such processing. For example, one such aspect is directed to an application in which the second set of line buffers includes pixels are addressed according to distance parameters defined relative to a current pixel, and the distance parameters are defined according to a window size of X rows and Y columns, where X is a fixed integer and Y is selected to establish the sampling-window size The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
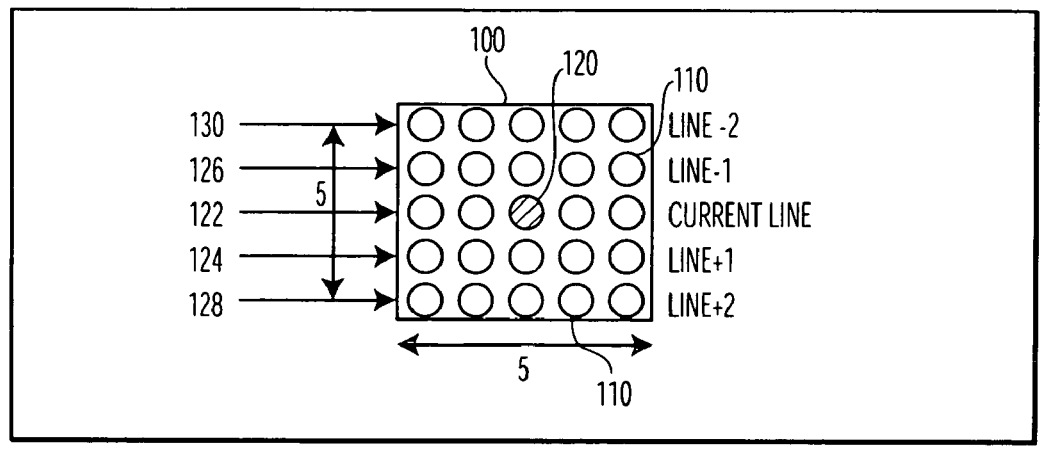
FIG. 1A is a diagram showing one example embodiment of a two-dimensional window having a 5×5 pixel array according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS EXAMPLE EMBODIMENTS

The present invention is believed to be highly applicable to methods and arrangements for pixel-data processing, and in applications sampling pixel data from irregular sampling windows, involving generic de-coupling of input and processing sampling data rates using line buffers. A digital video image is composed from an array, or matrix, of pixel data. The pixel data is conventionally arranged in lines and columns of pixels. The invention has been found to be particularly advantageous for video pixel processing arrangements requiring or benefiting from two-dimensional pixel sampling using sliding windows of irregular (i.e., varying) dimensions, for example, in video pixel processing arrangements adapted to process digital images of varying dimensions (i.e., varying pixel data array sizes), or where sliding window size is varied according to feedback information derived from previous window samples. While the present invention is not necessarily limited to such applications, an appreciation of various aspects of the invention is best gained through a discussion of examples in such an environment.

A digital video image is composed of a two-dimensional array of pixels, for example, an image displayed through a 720×512 array of pixels on a video display is typical. Movement or other changes to the video image over time are captured in "snapshots" of the video image viewed together and collectively referred to as a frame. Each pixel of the digital video image is represented by a set of data ("pixel data"). The qualities (e.g., intensity, etc.) of a particular pixel can vary from frame to frame responsive to changes in pixel data for a particular pixel occurring from frame to frame. Pixel data from each of the 720×512 array of pixels is conventionally stored in a frame storage memory and subsequently processed to control a video image.

A particular pixel's qualities, as part of an integrated digital image, are often related in some way to nearby pixel qualities. Additionally other common-mode characteristics, such as noise, frequently dictate consideration of nearby pixels while processing pixel data for a particular pixel. Considering a two-dimensional subset (i.e., a window) of pixels surrounding a pixel of interest is well known, pixel data for the pixel of interest as well as nearby pixels within the window being processed together as a group in some way. Typically, the window slides along a display maintaining a particular orientation with respect to the location of a pixel of interest, as data for each successive pixel in the display is processed. Conventionally, pixels are processed according to their location with a display, beginning with a pixel in the upper-left corner of the display and proceeding from left to right and top to bottom. Some information is determined regarding the behavior of the pixels within the sliding window while processing (e.g., adjusting or modifying) the data for the pixel of interest.

Certain video data manipulations operate on a fixed quantity of data, for example, N pixels simultaneously. One method to process video data is to select a uniform window around a pixel of interest that includes only N pixels, N being the quantity of pixels that can be manipulated at one time. The size of the window, and thus the range (e.g., distance) around the pixel of interest, is limited by the magnitude of N. In certain pixel data processing methods (e.g., noise filtering), it is desirable to consider a wide range of pixels surrounding a pixel of interest, but do so without increasing the quantity of N in order to retain processing efficiency and speed.

One method to consider a broader window around a pixel of interest is to select a subset of representative pixel data from within the window, and further processes only the selected pixel data to determine some information. In one example embodiment, a window size for a window of pixels around a pixel of interest is expanded when little change is detected in the information derived from pixel data within the window. Conversely, the window size is contracted when some threshold of change to the derived information is detected. A central processing unit (CPU) or other logic circuit dynamically determines and varies window size, thereby changing the quantity of pixels included with the window. However, if downstream data manipulation rates remain fixed, complex data synchronization problems are created. One solution, according to a method of the present invention, is to select a further representative subset (e.g., a sampling window) of N pixels from within the window, forwarding only the selected pixel data to a MMIO.

Consistent with a general embodiment, the present invention is implemented in the form of a pixel-data processing circuit having a decoupling line-buffer circuit coupled to an intermediate pre-fetch buffer, the decoupling line-buffer circuit, intermediate pre-fetch buffer and communications therebetween being controlled by a logic circuit. The pixel-data processing circuit of the present invention processes an input stream of selected pixels, for example from an MMIO, corresponding to an array of video pixels from a variable sized two-dimensional window. Processed pixel data is output to a further data-manipulation stage, for example a low pass filter video processing stage adapted to manipulate a fixed quantity of pixels simultaneously. The pixel-data processing circuit output rate is thus fixed at the input rate of the downstream data-manipulation stage, which may be different than the input data rate. The pixel-data processing circuit of the present invention is configured and arranged to minimize pixel latency between the input data stream and pixel data fetches by the downstream data-manipulation stage from the pixel-data processing circuit.

The input pixel data stream to the circuit of the present invention includes pixel data selected from the variable sized window according to a pre-determined orientation and pre-arranged in a sampling window array having a fixed sized. The circuit of the present invention further prepares the sample window pixel data for delivery to the data-manipulation stage. The sampling window size is pre-defined to contain a fixed quantity, N, of pixels, N being the quantity of pixel data that the data-manipulation stage can manipulate simultaneously.

In one example embodiment, the variable window size preferably has a fixed quantity of pixel lines, X, but a variable quantity of pixel columns, Y. In an alternative embodiment, the quantity of pixel lines, X, is also variable. The decoupling line-buffer circuit is configured to have X+1 line buffers, the length of each line buffer is adequate for storing the data corresponding to more than $Y_{MAX}$ pixels, where $Y_{MAX}$ is the number of pixel columns of the largest expected window size. The pre-fetch intermediate buffer is coupled to the decoupling line-buffer circuit. The logic circuit logic circuit is configured and arranged to control the communication of pixel data between and through the decoupling line-buffer circuit and pre-fetch intermediate buffer.

In one more particular example embodiment of the present invention, a video processing circuit of the present invention is included as a functional block immediately preceding the "SWAN" unit in the video signal processing arrangement described in the above-referenced, co-pending U.S. Patent Application entitled, "Motion Compensation With Subblock Scanning." The "SWAN" unit is a data-manipulation stage that includes low pass filtering of pixel data.

The video processing circuit of the present invention includes a decoupling line-buffer circuit consisting of a set of line buffers, and a second intermediate pre-fetch buffer. The video processing circuit receives a serial input stream of pixel data, the pixel data being the sampling window pixel data selected from a window surrounding a pixel of interest. The pixel of interest is included in the sampling window pixel data. The input pixel data stream represents pixels corresponding to an array of video pixels having a variable window size for sampling a video display array of pixels as a two-dimensional window that spans the pixels in the display array. The video processing circuit arranges a fixed quantity of pixel data for parallel output to a data-manipulation stage to reduce the reload time into the data-manipulation stage and save bandwidth. The downstream data-manipulation stage fetches N pixels simultaneously (i.e., in parallel), N preferably being a quantity equal to a perfect square. In one example embodiment of the present invention, the data-manipulation stage fetches pixel data representing 25 pixels simultaneously.

In one example embodiment, the variable window size preferably has a fixed height of X (lines or rows of) pixels and a variable width of Y (columns of) pixels. Additionally, Y is preferably an integral multiple, n, of X. In an alternative embodiment, X need not be fixed. Y need not be an integral multiple of X. Sampling window is preferably symmetrical, having dimensions X×X. Pixels selected from the variable window are arranged in the sampling window with the same relative location orientation to each other in the sampling window as the pixels held in the variable window. For embodiments of the present invention when N is a perfect square, the sampling window is configured to have uniform dimensions equal to X, X being the square-root of N. A minimum variable window size is the sampling window size. For example, N pixels arranged in an array having equal X×X dimensions. A maximum window size for sampling is also pre-defined for a particular pixel-data processing circuit application.

In one example embodiment of the present invention, a maximum expected window size is 20×5, the maximum window size including 100 pixels. Sampling window size being X×X is therefore 5×5, and sampling window includes a fixed quantity of 25 pixels. The downstream data-manipulation stage fetches pixel data for 25 pixels (or one sampling window of pixels) simultaneously from the video processing circuit of the present invention for further data manipulation. Where the sampling window is at the edge of the pixel display area such that neighboring pixels to the current pixel do not exist, the nearest pixel column/line is replicated and used in place for the absent pixel column/line; the implementation therefore being readily accomplished, e.g., using line-selection multiplexing.

FIG. 1A illustrates one particular example of a window embodiment 100 where a window size is the same as a sampling window size, both being 5 pixels (i.e., lines) high by 5 pixels wide (i.e., 5 columns), and containing 25 pixels 110. The window (and sampling window) pixel array is symmetrical around a current central pixel 120. The current central pixel is located in a current line 122. Video image lines are conventionally numbered left to right, and from top to bottom, beginning from the top left-hand corner of a display. A current line is defined as being a line on which a current pixel of interest is located. For reference, each line of window (and sampling window) 100 is named related to the current line, one line below the current line being denoted as "line+1" 124, one line above the current line denoted as "line−1" 126, two lines below the current line denoted as "line+2" 128, and two lines above the current line denote as "line−2" 130. Lines line−1 and line+1 are symmetric about the current line. Lines line−2 and line+2 are also symmetric about the current line, outside of lines line−1 and line+1 respectively, as shown.

Figure 1B:
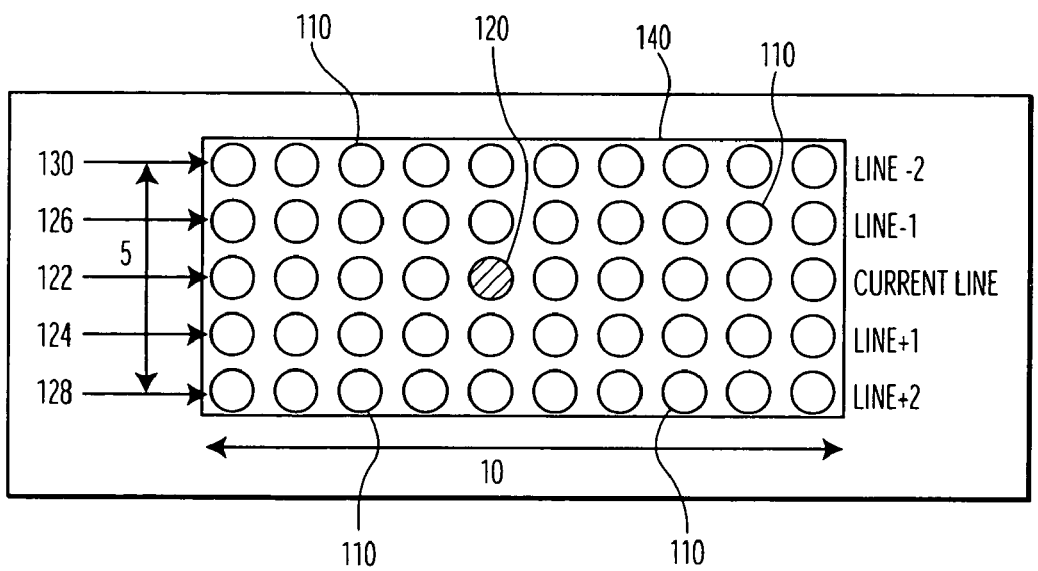
FIG. 1B is a diagram showing one example embodiment of a two-dimensional window having a 10×5 pixel array according to the present invention.

FIG. 1B shows one particular example embodiment of another window embodiment 140, the window dimensions being 5 pixels (i.e., lines) high, and 10 pixels wide. This window embodiment therefore contains 50 pixels 110, including the current central pixel 120. Pixels 110 need not be symmetric about current central pixel 120, as is the case shown in FIG. 1B. Pixel lines are denoted as in FIG. 1A. Current central pixel is located in current line 122. Sampling window size for window 140 is X×X, or 5×5, sampling window including 25 pixels. Window parameters are programmable, with maximum window size being pre-determined. Pixel data from a window is processed by the data-manipulation circuit at a fixed rate of N pixels at a time, in other words, one sampling window at a time since each sampling window includes N pixels.

Figure 2:
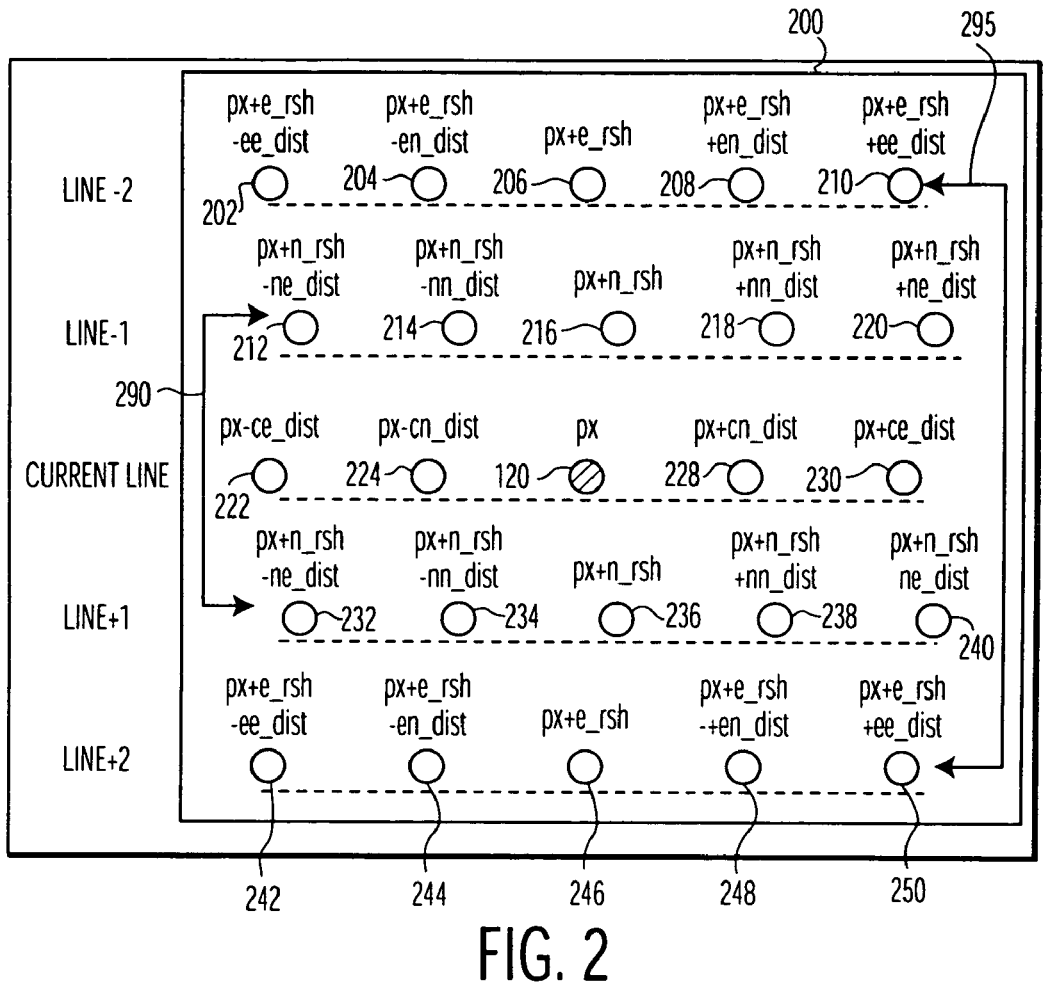
FIG. 2 is a diagram showing one example embodiment of a two-dimensional sampling window illustrating relative addressing system according to the present invention.

FIG. 2 shows an example embodiment of a window 200 (and in this embodiment, also a sampling window since window dimensions are symmetrical) of the present invention and illustrates a system of relative pixel addressing within a 5×5 window. Each pixel location is described by a set of variables with the respect to current central pixel 120. Current central pixel 120, to which other pixels are related, is optionally offset from the center of the window, for example, when the number of window columns are even, it is not possible to have identical quantities of pixels to the left and to the right of current central pixel 120. Table 1 lists relative addressing variables for an example system of pixel relative addressing according to the present invention.

TABLE 1

| Name | Description |
|---|---|
| cn_dist[1,4] | The left/right offset between the current central pixel and nearby pixels on the current line. |
| ce_dist[2,8] | The left/right offset between the current central pixel and end pixels on the current line. |
| nn_dist[1,4] | The left/right offset between the current central pixel and nearby pixels on lines line−1 and line+1. |
| ne_dist[2,8] | The left/right offset between the current central pixel and end pixels on lines line−1 and line+1. |
| en_dist[1,4] | The left/right offset between the current central pixel and nearby pixels on lines line−2 and line+2. |
| en_dist[2,8] | The left/right offset between the current central pixel and end pixels on lines line−2 and line+2. |
| n_rsh[0,3] | The line-shift offset to the right for lines line−1 and line+1. |
| e_rsh[0,3] | The line-shift offset to the right for lines line−2 and line+2. |

For example, the left/right offset between current central pixel 120 and nearby pixels (i.e., non-end pixels on a line) on the current line is "cn_dist" and permitted in the relative addressing system of the present invention to vary within the integer range from 1 to 4, inclusive. Variable "cn_dist" label is comprised of "c" connoting that the pixel being addressed resides in the current line, "n" connoting nearby pixels (as opposed to an end pixel) and "dist" connoting distance. The "e" of variable "ce_dist" connotes end pixels, other portions of the variable label connoting features as discussed above.

Each pixel of window 200 is labeled in FIG. 2 with a reference number and Table 2 correlates the reference number of each pixel of window 200 with an expression using the relative addressing variables of Table 1 describing each respective pixel location as shown on FIG. 2.

TABLE 2

| Reference No. | Pixel Relative Addressing Description | Line |
|---|---|---|
| 120 | Px, current central pixel | current line |
| 202 | px + e_rsh − ee_dist | line−2 |
| 204 | px + e_rsh − en_dist | line−2 |
| 206 | px + e_rsh | line−2 |
| 208 | px + e_rsh + en_dist | line−2 |
| 210 | px + e_rsh + ee_dist | line−2 |
| 212 | px + n_rsh − ne_dist | line−1 |
| 214 | px + n_rsh − nn_dist | line−1 |
| 216 | px + n_rsh | line−1 |
| 218 | px + n_rsh + nn_dist | line−1 |
| 220 | px + n_rsh + ne_dist | line−1 |
| 222 | px − ce_dist | current line |
| 224 | px − cn_dist | current line |
| 228 | px + cn_dist | current line |
| 230 | px + ce_dist | current line |
| 232 | px + n_rsh − ne_dist | line−1 |
| 234 | px + n_rsh − nn_dist | line−1 |
| 236 | px + n_rsh | line−1 |
| 238 | px + n_rsh + nn_dist | line−1 |
| 240 | px + n_rsh + ne_dist | line−1 |
| 242 | px + e_rsh − ee_dist | line−2 |
| 244 | px + e_rsh − en_dist | line−2 |
| 246 | px + e_rsh | line−2 |
| 248 | px + e_rsh + en_dist | line−2 |
| 250 | px + e_rsh + ee_dist | line−2 |

Distances from any pixel within window (i.e., a sampled pixel) with respect to the current central pixel on the current line is denoted by the relative addressing expressions defined in Table 2. Since window parameters (e.g., dimensions) are programmable, a location of each pixel of a window and sampling window are both describable relative to a current central pixel selected with the window and sampling window respectively.

Figure 3:
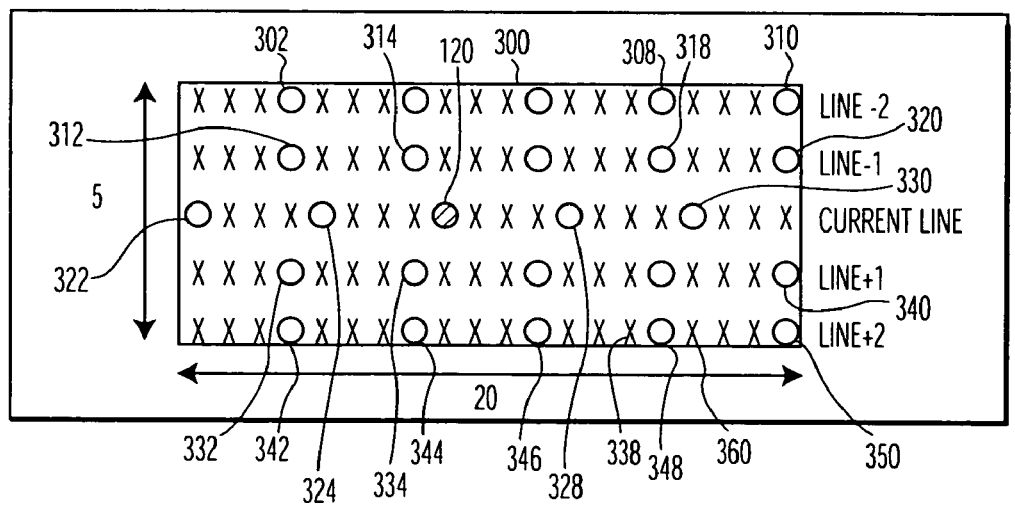
FIG. 3 is a showing one example embodiment of a two-dimensional window having a 20×5 pixel array illustrating relative addressing system according to the present invention.

FIG. 3 illustrates an example embodiment of a variable window 300 comprising a 20×5 array of pixels. Pixels indicated as circles are selected from window 300 by the CPU, selected pixels determined from the above-described relative addressing expressions. Selected pixels of FIG. 3 are given reference numbers similar to those shown in FIG. 2 incremented by 100 to connote that certain pixels of FIG. 3 are determined from expressions corresponding similarly-referenced pixels illustrated in FIG. 2. Pixels within window 300 designated by a circle symbol (rather than an "X" symbol), selected by application of the relative addressing expressions of Tables 1 and 2, have orientations with respect to each of the other selected pixels within window 300, that are similar to the orientations between similarly-reference pixels of window 200.

Figure 4:
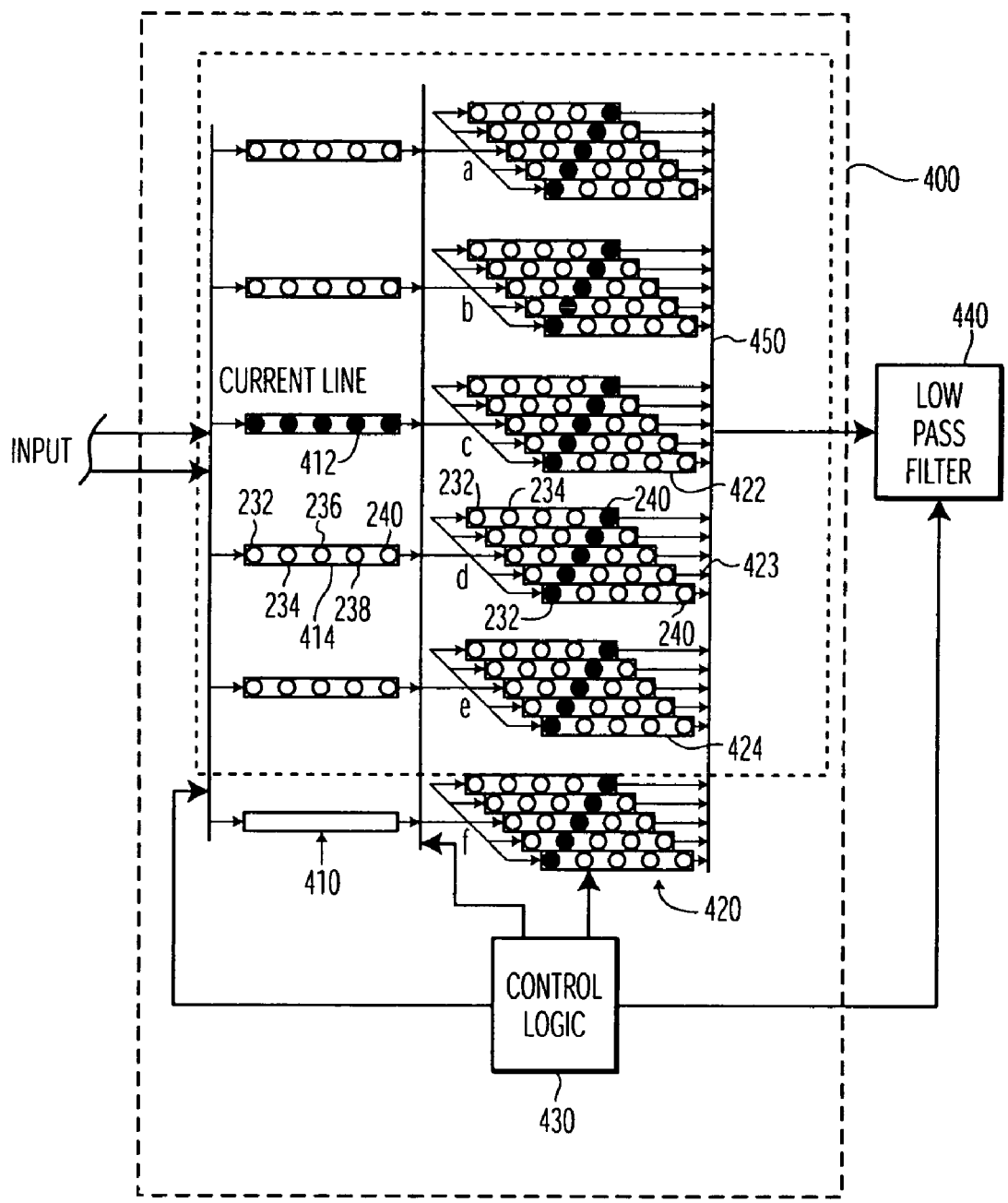
FIG. 4 is a diagram showing one example embodiment of a pixel-data processing circuit having a video processing circuit according to the present invention.

FIG. 4 illustrates one example embodiment of a pixel-data processing circuit 400 of the present invention having a decoupling line-buffer circuit 410, an intermediate pre-fetch buffer 420 and a control logic circuit 430. Pixel data, passed from a display buffer (not shown), is serially received at a first rate by circuit 400 and arranged in the decoupling line-buffer circuit 410 in a configuration, e.g., having six lines of 256 pixels each for a total of 1536 pixels. In another embodiment, the decoupling line-buffer circuit is configured for five lines of 128 pixels. In either instance, this pixel data is directed by control logic circuit 430 serially into decoupling line-buffer circuit 410.

From each of the six lines of the decoupling line-buffer circuit 410, the control logic circuit 430 begins copying the first-arriving 32 pixels into a respective one of the intermediate pre-fetch buffer sets, or pixel cell arrays, depicted as items 420a-420f. According to the previously-discussed sampling window configuration, this copying involves passing the pixel data corresponding to the current sampling window.

In one example embodiment of the present invention, the sampling window array has five lines of pixel data, and five of the six lines from the decoupling line-buffer circuit 410 are used to hold input pixel data and de-couple the video processing circuit's pixel data input rate from the video processing circuit's processing (i.e., output) rate. As described above, each of five line buffers of the decoupling line-buffer circuit 410 is used to feed one of the intermediate pre-fetch buffer sets 420a-420f according to the sampling window configuration.

In an example implementation, the control logic 430 includes a multiplexer-based logic circuit having five select inputs for selecting each of the previously-discussed 25 cells of the corresponding intermediate line buffer. In an alternative embodiment, selection logic is implemented through software manipulation of pixel data between decoupling line-buffer circuit 410 and intermediate pre-fetch buffer 420, for example, by control logic circuit 430 directing pixel data communication over an interconnection bus.

Intermediate pre-fetch buffer 420 is communicatively coupled to data-manipulation stage 440 through a parallel channel 450 adapted to communicate all N pixels of sampling window simultaneously. FIG. 4 shows shaded pixel locations within each pixel cell array of intermediate pre-fetch buffer 420 representing the pixel cell locations simultaneously clocked onto parallel channel 450 for communication to data-manipulation stage 440. Each shaded pixel cell array location is coupled to channel 450 implemented in hardware in one example embodiment, for example through dedicated data communication paths (i.e., hard wiring), or alternatively through an arrangement of demultiplexors. In another embodiment of the present invention, coupling is implemented through software manipulation of pixel data between intermediate pre-fetch buffer 420 and channel 450, for example, by control logic circuit 430 directing pixel data communication.

In one example embodiment illustrated in FIG. 4, line buffer 414 holds pixel data for 5 pixels of the current line of a 5×5 sampling window. Each pixel in line buffer 414 is referenced according to the method set out in Table 2 above, and illustrated in FIG. 2. Pixel data from line buffer 414 is replicated and stored in pixel cell array 423, shown arranged in 5 lines, each having 5 pixels of current line pixel data from line buffer 414. In alternative embodiments, the orientation of pixel data within each pixel cell array can be modified from that shown in FIG. 4, for example, the order of pixels can be stored in pixel cell array in reversed order so that pixel 232 occupies a "top-right" position and pixel 240 occupies a "bottom-left" position thereby arranging the pixel data from top to bottom along channel 450 in a manner that pixels would be encountered in moving from left to right and top to bottom from a pixel located in the upper-left corner of a sample window (e.g., referencing FIG. 2 and beginning with pixel 202, moving right pixel 204 is encountered next, then 206, 208, 210, then 212, 214, etc. until pixel 250 is encountered last). The configuration of pixel data in channel 450 for presentation to data-manipulation stage 440 is within the discretion of the circuit designer and/or the target application.

Accordingly, various example implementations of the present invention characterize data-processing approaches involving line-buffers used to decouple incoming pixel display data and to deliver a fixed number of pixels through a parallel channel, e.g., as may be required by a video processing stage such as a low pass filter used as the stage 440. Various aspects of these example implementations can be implemented to reduce pixel latency, save hardware and design cost, and offset complexity in pixel-data processing applications requiring a capability to process pixel data derived from variable sized windows. In various implementations of the present invention, pre-fetching pixel data into an intermediate pre-fetch buffer provides flexibility and reduces reload time to downstream stages. Such implementations can be used with the relative addressing method provides decoupling between variable pixel data quantities included in windows of varying size and a fixed data-manipulation stage, thus permitting window size to vary where beneficial to an overall video image processing scheme.

The present invention should not be considered limited to the particular examples described above. Various modifications, equivalent processes, as well as numerous structures to which the present invention may be applicable fall within the scope of the present invention, as fairly set forth in the appended claims.

What is claimed is:

1. In a video processing circuit having an input stream of pixels corresponding to an array of video pixels, having a variable window size for sampling subsets of the array as a two-dimensional window that spans the pixels in the array, having a video processing stage that inputs pixels using a fixed number of pixels, a method for delivering the input stream of pixels to the video processing stage, the method comprising:

establishing a window size and a sampling-window size, such that the window size is a multiple of the sampling-window size and the sampling-window size defines the fixed number of pixels; and concurrently storing pixels from the input stream into a first set of line buffers, the pixels stored in the first set of line buffers including pixels for the established window size, prefetching the stored pixels from the first set of line buffers into a second set of line buffers, the second set of line buffers being sufficiently long to store at least the pixels corresponding to the established sampling-window size, and for the video processing stage, fetching the fixed number of pixels from the second set of line buffers.

2. The method of claim 1, wherein each array of video pixels represents a video frame.

3. The method of claim 2, wherein the window size has X rows and Y columns, and the sampling-window size has X rows, where X is a fixed integer.

4. The method of claim 3, wherein establishing window size includes selecting Y from a set of possible integers.

5. The method of claim 4, wherein the fixed number of pixels equals 25, X equals 5 and the set of possible integers for Y is 1 through 4.

6. The method of claim 1, wherein the first set of line buffers is used to decouple the input stream of pixels from the second set of line buffers.

7. The method of claim 1, wherein the second set of line buffers includes pixels that are addressed according to distance parameters defined relative to a current pixel.

8. The method of claim 7, wherein the distance parameters are defined according to the window size.

9. The method of claim 1, wherein the second set of line buffers includes pixels that are addressed according to distance parameters defined relative to a current pixel, wherein the distance parameters are defined according to a window size of X rows and Y columns, where X is a fixed integer and Y is selected to establish the sampling-window size.

10. The method of claim 1, wherein said respective line buffers have a length defined to optimize throughput and wherein said prefetching and said fetching includes passing pixel data through the respective line buffers to reduce cycle time.

11. The method of claim 1, wherein the window size has X rows and Y columns, where X is a fixed integer and Y is selected to establish the sampling-window size, and wherein the second set of line buffers includes X line buffers for respectively storing X rows of the pixels.

12. The method of claim 11, wherein the X line buffers of the second set of line buffers includes a center line buffer storing one row the pixels corresponding to a current line of the window, and at least one line buffer for storing another row of the pixels.

13. The method of claim 11, wherein the fixed number of pixels equals 25, X equals 5 and the set of possible integers for Y is 1 through 4.

14. In a video processing circuit having an input stream of pixels corresponding to an array of video pixels, having a variable window size for sampling subsets of the array as a two-dimensional window that spans the pixels in the array, having a video processing stage that inputs pixels using a fixed number of pixels, a method for delivering the input stream of pixels to the video processing stage, the method comprising:

establishing a window size and a sampling-window size, such that the window size is a multiple of the sampling-window size and the sampling-window size defines the fixed number of pixels; and concurrently decoupling the pixels from the input stream by using a first set of line buffers to store the pixels from the input stream, the pixels stored in the first set of line buffers including pixels for the established window size, prefetching the stored pixels from the first set of line buffers into a second set of line buffers, the second set of line buffers being sufficiently long to store at least the pixels corresponding to the established sampling-window size, and for the video processing stage, fetching the fixed number of pixels from the second set of line buffers by addressing according to distance parameters defined relative to a current one of the pixels being stored in the second set of line buffers, wherein the distance parameters are defined according to a window size of X rows and Y columns, where X is a fixed integer and Y is selected to establish the sampling-window size.

15. A video processing circuit having an input stream of pixels corresponding to an array of video pixels, having a variable window size for sampling subsets of the array as a two-dimensional window that spans the pixels in the array, having a video processing stage that inputs pixels using a fixed number of pixels, a circuit arrangement for delivering the input stream of pixels to the video processing stage, the circuit arrangement comprising:

means for establishing a window size and a sampling-window size, such that the window size is a multiple of the sampling-window size and the sampling-window size defines the fixed number of pixels;

a first set of line buffers;

a second set of line buffers; and means for concurrently storing pixels from the input stream into the first set of line buffers, the pixels stored in the first set of line buffers including pixels for the established window size, prefetching the stored pixels from the first set of line buffers into a second set of line buffers, the second set of line buffers being sufficiently long to store at least the pixels corresponding to the established sampling-window size, and for the video processing stage, fetching the fixed number of pixels from the second set of line buffers.

16. A video processing circuit having an input stream of pixels corresponding to an array of video pixels, having a variable window size for sampling subsets of the array as a two-dimensional window that spans the pixels in the array, having a video processing stage that inputs pixels using a fixed number of pixels, a circuit arrangement for delivering the input stream of pixels to the video processing stage, the circuit arrangement comprising:

a programmable circuit for establishing a window size and a sampling-window size, such that the window size is a multiple of the sampling-window size and the sampling-window size defines the fixed number of pixels;

a first set of line buffers;

a second set of line buffers; and a data processing circuit configured and arranged to process video pixels by concurrently storing pixels from the input stream into the first set of line buffers, the pixels stored in the first set of line buffers including pixels for the established window size, prefetching the stored pixels from the first set of line buffers into a second set of line buffers, the second set of line buffers being sufficiently long to store at least the pixels corresponding to the established sampling-window size, and for the video processing stage, fetching the fixed number of pixels from the second set of line buffers.

17. The circuit arrangement of claim 16, wherein each array of video pixels represents a video frame.

18. The circuit arrangement of claim 17, wherein the window size has X rows and Y columns, and the sampling-window size has X rows, where X is a fixed integer.

19. The circuit arrangement of claim 18, wherein the programmable circuit is adapted to select Y from a set of possible integers.

20. The circuit arrangement of claim 19, wherein the fixed number of pixels equals 25, X equals 5 and the set of possible integers for Y is 1 through 4.

21. The circuit arrangement of claim 16, wherein the first set of line buffers is used to decouple the input stream of pixels from the second set of line of buffers.

22. The circuit arrangement of claim 16, wherein the second set of line buffers includes pixels that are addressed according to distance parameters defined relative to a current pixel.

23. The circuit arrangement of claim 22, wherein the distance parameters are defined according to the window size.

24. The circuit arrangement of claim 16, wherein the second set of line buffers includes pixels that are addressed according to distance parameters defined relative to a current pixel, wherein the distance parameters are defined according to a window size of X rows and Y columns, where X is a fixed integer and Y is selected to establish the sampling-window size.

25. The circuit arrangement of claim 16, wherein said respective line buffers have a length defined to optimize throughput and wherein the data processing circuit is further configured and arranged to said pass pixel data through the respective line buffers to reduce cycle time.

26. The circuit arrangement of claim 16, wherein the window size has X rows and Y columns, where X is a fixed integer and Y is selected to establish the sampling-window size, and wherein the second set of line buffers includes X line buffers for respectively storing X rows of the pixels.

27. The circuit arrangement of claim 26, wherein the X line buffers of the second set of line buffers includes a center line buffer storing one row the pixels corresponding to a current line of the window, and at least one line buffer for storing another row of the pixels.

28. The circuit arrangement of claim 26, wherein the fixed number of pixels equals 25, X equals 5 and the set of possible integers for Y is 1 through 4.

* * * * *